Figures 1, 2, 3:
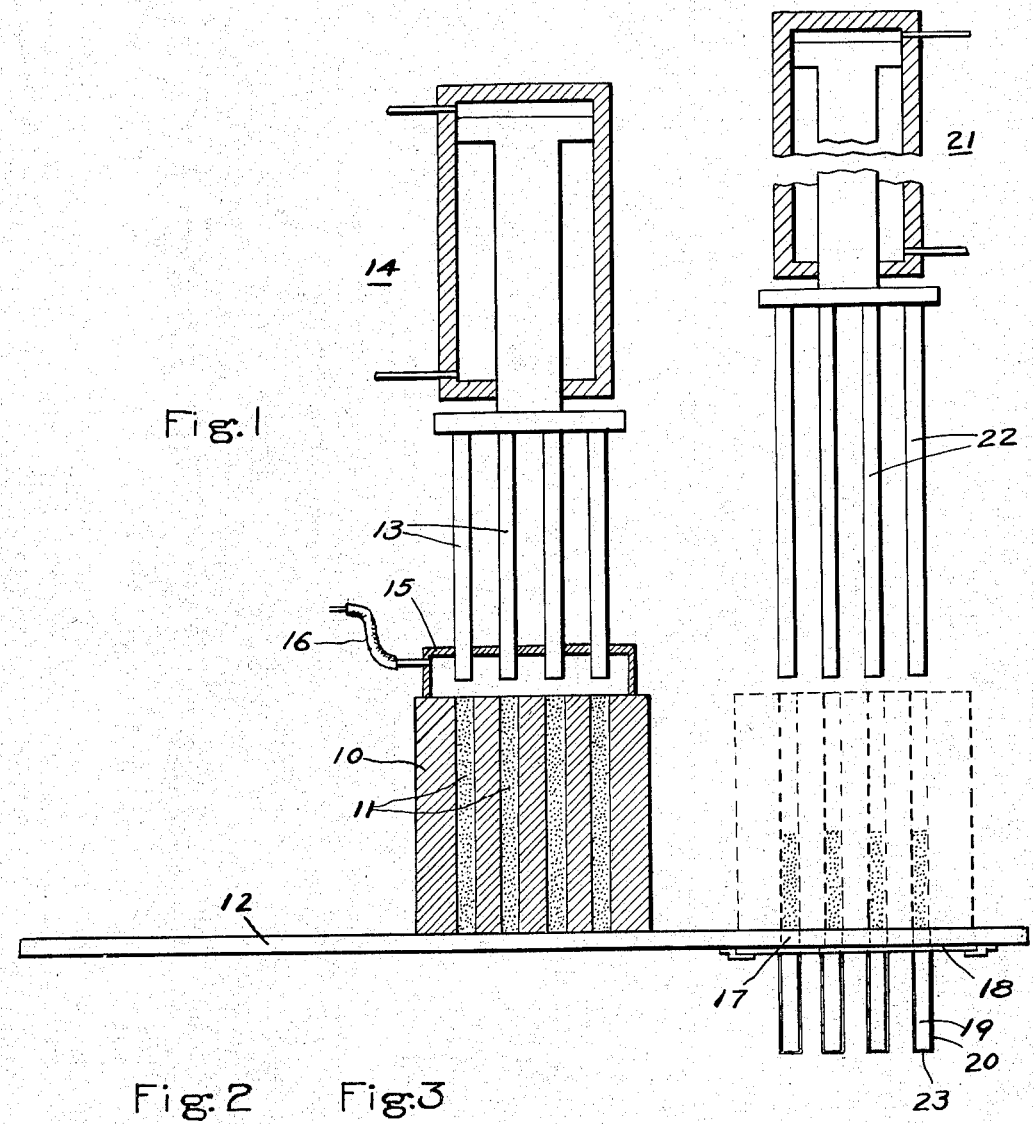

April 12, 1938.   J. W. BELL   2,113,978

PACKAGING

Filed Oct. 31, 1933

Inventor
John W. Bell
Alexander F. MacDonald
His Attorney

Patented Apr. 12, 1938

2,113,978

UNITED STATES PATENT OFFICE 2,113,978

PACKAGING

John W. Bell, Toronto, Ontario, Canada, assignor of one-twentieth to Frank V. Bell, St. Catharines, Ontario, Canada Application October 31, 1933, Serial No. 696,018

5 Claims. (Cl. 99—171)

My invention relates to packaging pulverous or ground products and particularly to packaging coffee for retail distribution.

I aim by my invention to provide a means whereby coffee may be distributed by retail to consumers in convenient packages without substantial deterioration due to exposure to the air and conveniently used by the consumer in small quantities as desired over an extended period of time without material deterioration while the package is being used up. I aim to accomplish the above purposes and also provide a package which is strong, compact, attractive and of low cost.

It is recognized that the aroma and flavor of roasted coffee are due to the presence of an essential oil. On exposure to the air this oil which contains a free fatty acid, takes up oxygen which causes it to become rancid, destroying the aroma and flavor and causing it to become unpalatable. The degree of deterioration is a function of the time, of exposure of the coffee to the air, the extent of surface exposed, and the freedom of circulation of fresh air over the exposed surface.

To avoid oxygenation of roasted coffee and consequent deterioration of the product it has been a customary practice for a consumer to buy unroasted coffee beans and roast and grind them in his own home. To avoid the difficulties of home roasting another practice has been for the retailer to stock the roasted coffee beans, and grind them for the customer when sold to him. This does not remove the burden on the retailer to keep his stock fresh and moreover the ground quantity in the hands of the purchaser rapidly deteriorates as it is being used up. The commercial desirability of distributing coffee in its roasted ground form whereby it may be uniformly roasted and blended by a manufacturer, has led to various attempts to offset the rapid deterioration which takes place when the coffee is in its ground form with the consequent enormous increase in surface exposed to the air. One such attempt consists in the roasted blended and ground coffee being sealed in containers impervious to the air and distributed to retailers in this form. A large amount of air is present in the voids and deterioration takes place to some extent. Some manufacturers take precautions by way of supervision of the age of stocks kept by the retailers to assure that their branded products which have become stale are not sold to the consumer. This method has no effect on the rapid deterioration of the coffee when the consumer opens the sealed package and exposes the product to fresh air with the result that unless the whole package is used promptly the quality of the coffee gets worse and worse as the package is used.

Another attempt consists in sealing the roasted blended and pulverized coffee in containers from which the air has been evacuated or replaced by an inert gas. This method likewise has the disadvantage that as soon as the package is opened the voids are immediately filled with air and deterioration in the hands of the consumer takes place as previously mentioned.

My invention on the other hand not only provides a means whereby ground coffee may reach the consumer with a minimum of deterioration but also assures that when the consumer purchases a package, it may be conveniently used in small quantities from time to time without material deterioration of the remainder till the package has been completely consumed. My invention also provides a package which is inexpensive, readily handled, compact and attractive in appearance. Further advantages of my invention will become apparent as the description proceeds.

In accordance with my invention I compress the ground coffee into an elongated cylinder, insert the cylinder into a seamless tube of tough, flexible material which is impervious to air and moisture, and which may be readily cut with a knife. The compressed coffee expands slightly which with the shrinkage of the tube if desired and as later described, fills the tube very tightly. The ends of the cylindrical unit thus formed are protected preferably by caps of metal or other material which frictionally engage the outer walls of the cylinder.

In the drawing Fig. 1 shows diagrammatically an apparatus whereby my method of packaging coffee may be carried out, some of the parts being shown in cross section; Fig. 2 shows a packed unit as prepared by the apparatus of Fig. 1 and Fig. 3 shows in cross section the unit of Fig. 2 completed by the addition of end caps.

Referring to the drawing 10 represents a multiple mold box having a plurality of cylindrical molds 11 open at both ends. The mold box is placed on the flat charging table 12 and filled with freshly roasted, blended and ground coffee. The mold box is then moved along the surface of the table till it is in the position indicated in the drawing beneath the rams 13. The rams are part of a hydraulic press generally indicated at 14 and which is suitably supported above the charging table 12. A hood 15 through the top of which the rams are slidable, is lowered over the mold box. A suitable gasket is provided between the mold box and the hood to assure an air tight joint. The air is now withdrawn from beneath the hood through the exhaust line 16. As the coffee in the mold is in loose pulverized form, the air is also withdrawn from the voids or is reduced to the same pressure in the voids as it is in the chamber. When the degree of exhaust has reached the desired stage the hydraulic press is operated and the rams 13 descend compressing the coffee in the molds. A pressure of about 2000 pounds per square inch will compress the coffee from its loose powdered form to a compact cylindrical unit of about forty percent of its original volume and having a small proportion of voids. As the compression starts any air remaining in the loose coffee will be trapped to some extent and compressed. Preferably the degree of exhaust used should be such that the pressure of the air in the voids of the compressed bricks is approximately atmospheric pressure.

After compression the rams 13 are elevated and the hood raised. The charging box is now moved to discharge position shown in the drawing in dotted lines to the right of the charging position. In this position the molds are in register with a series of openings 17 in the work table. Beneath the work table in this position is a removable discharge tray 18 having depending therefrom a plurality of tubes 19 open at both ends, corresponding in number to the molds. When the tray is in the position illustrated the tubes 19 are in register with the openings 17. Each tube has a container 20 tightly fitting having one closed end. The hydraulic discharging mechanism generally indicated by 21, is now operated and its rams 22 enter the molds 11, engage the compressed units and project them through the openings 17 in the work table 12 into the tubes 19. The compressed unit then encounters the closed end 23 of the container 20. Further movement of the rams then expels the compressed unit from the loading tube carrying the container with and around it. The unit is then conveyed away and dried in a current of warm air.

The material which I prefer to use for the containing tube is a seamless tube of transparent cellulose product such as cellulose acetate which is now available commercially in tubular form. This product is tough and flexible, is impervious to air and water and is easily cut with a knife. Before loading the container tubes on the discharge tubes they are preferably soaked in a mixture of water and glycerine, which causes them to swell somewhat. When the compressed coffee unit is ejected from the discharge tube with the container around it, the coffee slowly swells. The containing tube also shrinks when drying which, in conjunction with the swelling of the coffee, causes the flexible containing tube to very tightly embrace and confine the coffee.

Fig. 2 illustrates the coffee package as delivered from the unloading machine. To each end of the package I apply a suitable protective cap 24 as illustrated in Fig. 3, which shows a cross-section of the package of Fig. 2 with caps applied at upper and lower end. The cap 24 has a downwardly depending flange 25 which engages the side wall of the package. An inwardly extending bead 26 provides a line contact. This provides a tight joint which prevents the ingress of air to the exposed top of the compressed unit.

Packages of coffee in accordance with my invention are compact, occupying less storage and shelf space than packages of ground coffee in its loose form. Due to the evacuation of air in packaging and the highly compressed state little air is present in the package to cause deterioration. The impervious outer shell and tightly fitting cap prevents the circulation of further air. The result is that my package can be stocked by retailers for a long time without material deterioration. The most important advantage, however, is that when purchased by the consumer, he may use the coffee a small amount at a time over an extended period with little deterioration of the remainder of the package between times. In use the consumer removes the protective cap and cuts off the amount required. The coffee out of the package is readily crumbled to its original ground form. The material of the side wall of the container is cut off with the coffee by means of the ordinary household knife and without the necessity of any special tool. When the quantity desired is removed the exposed surface of the remainder of the package is hard and compact and air cannot penetrate into the bulk of the remaining coffee. The lid is pressed down on the shortened package, making a tight joint with the side and preventing the circulation of fresh air over the newly exposed top surface. The consumer can in the above manner, continue to use the package till it is all used. Any small deterioration which takes place will be confined to a thin layer on the newly exposed top and the bulk of the remaining product is not affected. If the package is used daily the deterioration is not enough to be noticeable. If, however, the package is left for an inordinately long time, a thin layer may be scraped from the upper surface and discarded when the package is opened. Thus any deteriorated coffee in these circumstances is confined to a definite limited surface where it can be removed with little waste and leaving the balance unaffected.

As I have described my invention the air is evacuated from the loose coffee before compression. The higher the degree of vacuum obtained, the better, but in the commercial packaging an absolute vacuum is not obtained and some small pressure of air remains. This amount of air is so small that coffee packed in this manner has the advantages heretofore recited. However, to further guard against deterioration, I may by suitable means before the coffee is compressed, displace the air present in the voids by carbon dioxide or any gas which is not deleterious to the coffee. In this event it is desirable that the pressure of gas be reduced to such an extent that when coffee is compressed the gas trapped in the voids and consequently compressed, will have a residual pressure approximately atmospheric.

The package in accordance with my invention, is attractive in appearance which is a distinct advantage, as this market is highly competitive. It is also strong and admits of handling in the ordinary manner. As the package is relatively cheap, coffee can be retailed in small size packages, for example, half pound and smaller, without unduly enhancing the sale price.

In the process as illustrated and described above, the size of mold used is such as to produce a single unit with each ram. It may be desirable to so proportion the size of the molds that the compressed unit ejected from the discharge tubes embraced with its container may be of sufficient length that it may be subdivided later by cutting into shorter lengths, each of requisite proportions to form a suitable package. I have found that a suitable size for pound packages is one and seven eighths inches diameter. The length of a pound package of this diameter would be about eleven inches. For half pound and smaller sizes, I found one and five eighths inches a suitable diameter.

While I have described my invention in detail in connection with packaging coffee, I do not desire to be limited thereto, except as defined in the appended claims, as in some of its aspects my invention may find use with other materials than coffee.

What I claim as new and desire to secure by Letters Patent of the United States is:

1. A package of finely divided, non-coherent and normally bulky material comprising an elongated cylindrical body of said material compressed to at least one-half of its normal volume and tending to expand upon the release of confining pressure, said body being confined in an insoluble tube of tough material which is impervious to air, easily cut and of film-like thickness, whereby said body is held under compression to form a hard solid unit, and closures for the end of said unit.

2. A package of finely divided, non-coherent and normally bulky material comprising an elongated cylindrical body of said material compressed to at least one-half of its normal volume and tending to expand upon the release of confining pressure, said body being confined in an insoluble tube of tough material which is impervious to air, easily cut and of film-like thickness, whereby said body is held under compression to form a hard solid unit, and closures for the end of said unit, one of said closures comprising a metal cap with a downwardly extending resilient flange having an inwardly directed bead engaging the outer wall of the unit.

3. A package of finely divided, non-coherent and normally bulky material comprising an elongated cylindrical body of said material compressed to at least one-half of its normal volume and tending to expand upon the release of confining pressure, said body being confined in an insoluble tube of tough material which shrinks upon being dried, is impervious to air, easily cut and of film-like thickness, whereby said body is held under compression to form a hard solid unit, and closures for the end of said unit.

4. A package of finely divided coffee comprising an elongated cylindrical body of said coffee compressed to at least one-half of its normal volume and tending to expand upon the release of confining pressure, said body being confined in a tube of tough material of film-like thickness which is impervious to air, easily cut and composed of a cellulose product, whereby said body is held under pressure to form a hard solid unit, and closures for the end of said unit.

5. A package of finely divided coffee comprising an elongated cylindrical body of said coffee compressed to at least one-half of its normal volume and tending to expand upon the release of confining pressure, said body being confined in a tube of tough material of film-like thickness which is impervious to air, easily cut and composed of a cellulose product, whereby said body is held under pressure to form a hard solid unit, and closures for the end of said unit, one of said closures comprising a metal cap with a downwardly extending flange having an inwardly directed bead engaging the outer wall of the unit.

JOHN W. BELL.